US008327642B2

(12) United States Patent
Uhm et al.

(10) Patent No.: US 8,327,642 B2
(45) Date of Patent: Dec. 11, 2012

(54) MULTIPLE TUBE PREMIXING DEVICE

(75) Inventors: Jong Ho Uhm, Simpsonville, SC (US); Balachandar Varatharajan, Loveland, OH (US); Willy Steve Ziminsky, Simpsonville, SC (US); Gilbert Otto Kraemer, Greer, SC (US); Ertan Yilmaz, Albany, NY (US); Benjamin Lacy, Greer, SC (US); Christian Stevenson, Inman, SC (US); David Felling, Greenville, SC (US)

(73) Assignee: General Electric Company, Schenectady, NY (US)

( * ) Notice: Subject to any disclaimer, the term of this patent is extended or adjusted under 35 U.S.C. 154(b) by 817 days.

(21) Appl. No.: 12/254,903

(22) Filed: Oct. 21, 2008

(65) Prior Publication Data

US 2010/0095676 A1 Apr. 22, 2010

(51) Int. Cl.
*F02C 7/22* (2006.01)

(52) U.S. Cl. ................ 60/737; 60/746; 60/740; 60/748; 239/243

(58) Field of Classification Search ............. 60/734–750
See application file for complete search history.

(56) References Cited

U.S. PATENT DOCUMENTS 6,026,645 A * 2/2000 Stokes et al. .................... 60/737
6,672,073 B2 * 1/2004 Wiebe ............................. 60/796
7,200,998 B2 * 4/2007 Inoue et al. ..................... 60/776

* cited by examiner

*Primary Examiner* — William H Rodriguez
*Assistant Examiner* — Steven Sutherland
(74) *Attorney, Agent, or Firm* — Sutherland Asbill & Brennan LLP

(57) ABSTRACT

The present application provides a premixer for a combustor. The premixer may include a fuel plenum with a number of fuel tubes and a burner tube with a number of air tubes. The fuel tubes extend about the air tubes.

10 Claims, 3 Drawing Sheets

MULTIPLE TUBE PREMIXING DEVICE

STATEMENT REGARDING FEDERALLY SPONSORED RESEARCH AND DEVELOPMENT

This invention was made with government support under Contract No. DE-FC26-05NT42643, awarded by the U.S. Department of Energy. The Government has certain rights in this invention.

TECHNICAL FIELD

The present application relates generally to gas turbine engines and more particularly relates to a multiple tube premixer with tube-in-tube gas injectors and an inert sheath.

BACKGROUND OF THE INVENTION

Gas turbine efficiency generally increases with the temperature of the combustion gas stream. Higher combustion gas stream temperatures, however, may produce higher levels of undesirable emissions such as nitrogen oxides ($NO_x$) and the like. $NO_x$ emissions generally are subject to governmental regulations. Improved gas turbine efficiency therefore must be balanced with compliance with emissions regulations.

Lower $NO_x$ emission levels may be achieved by providing for good mixing of the fuel stream and the air stream. For example, the fuel stream and the air stream are premixed in a Dry Low $NO_x$ (DLN) combustor before being admitted to a reaction or a combustion zone. Such premixing tends to reduce combustion temperatures and $NO_x$ emissions output. Other systems attempt to reduce flame holding by inserting diluents into the fuel-air mixture so as to achieve a predetermined mixture and/or temperature.

Premixing, however, also may cause or promote auto-ignition, flashback, flame holding and/or other types of performance issues. Specifically, flame holding may be impacted by the non-uniformity in the fuel and the air streams due to the incoming profile. Further, flame holding also may be an issue with fuel jet interaction within the nozzle.

There is therefore a desire for a premixer to provide good fuel-air mixing so as to increase overall efficiency and flame holding margin while complying with emissions regulations. Preferably such a premixer may be used with new and existing equipment.

SUMMARY OF THE INVENTION

The present application thus provides a premixer for a combustor. The premixer may include a fuel plenum with a number of fuel tubes and a burner tube with a number of air tubes. The fuel tubes extend about the air tubes.

The present application also provides a method of mixing a first flow and a second flow. The method may include the steps of dividing the first flow into a number of first flow tubes, dividing the second flow into a number of second flow tubes, placing the first flow tubes about the second flow tubes, and mixing the first flow and the second flow within the second flow tubes.

The present application also provides for a premixer for a combustor. The premixer may include a fuel plenum with a number of first flow tubes and a number of second flow tubes and a burner tube with a number of air tubes. The first flow tubes and the second flow tubes extend about the air tubes.

These and other features of the present application will become apparent to one of ordinary skill in the art upon review of the following detailed description when taken in conjunction with the drawings and the appended claims.

DETAILED DESCRIPTION OF THE INVENTION

Figure 1:
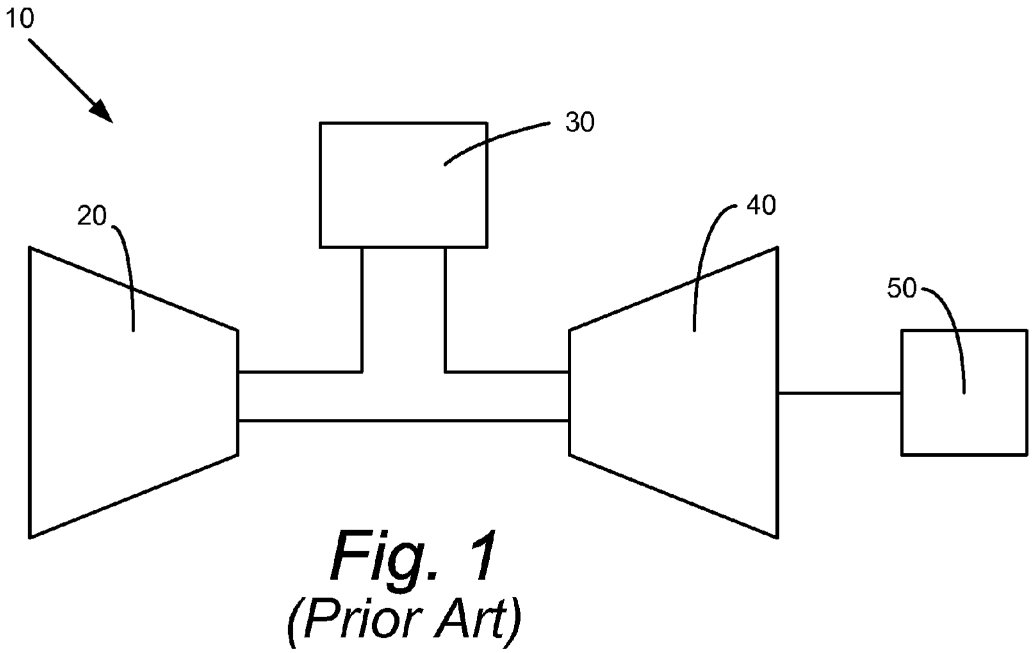
FIG. 1 is a schematic view of a gas turbine engine.

Referring now to the drawings in which like numbers refer to like elements throughout the several views, FIG. 1 shows a schematic view of an example of a gas turbine engine 10. As is known, the gas turbine engine 10 may include a compressor 20 to compress an incoming flow of air. The compressor 20 delivers the compressed flow of air to the combustor 30. The combustor 30 mixes the compressed flow of air with a flow of fuel and ignites the mixture. (Although only a single combustor 30 is shown, the gas turbine engine 10 may include any number of combustors 30.) The hot combustion gases are in turn delivered from the combustor 30 to a turbine 40. The turbine 40 drives the compressor 20 and an external load 50 such as an electrical generator and the like. The gas turbine engine 10 may use other configurations and components herein.

Figure 2:
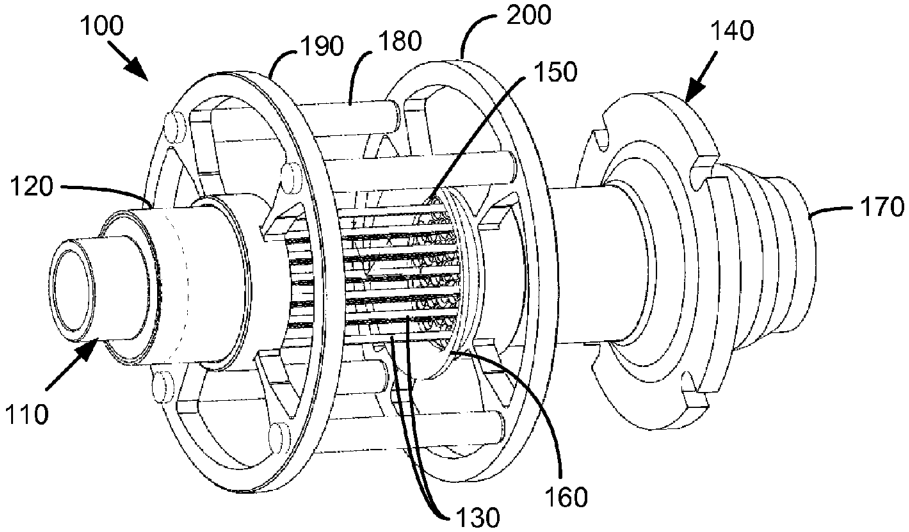
FIG. 2 is a perspective view of a premixer as is described herein.
Figure 3:
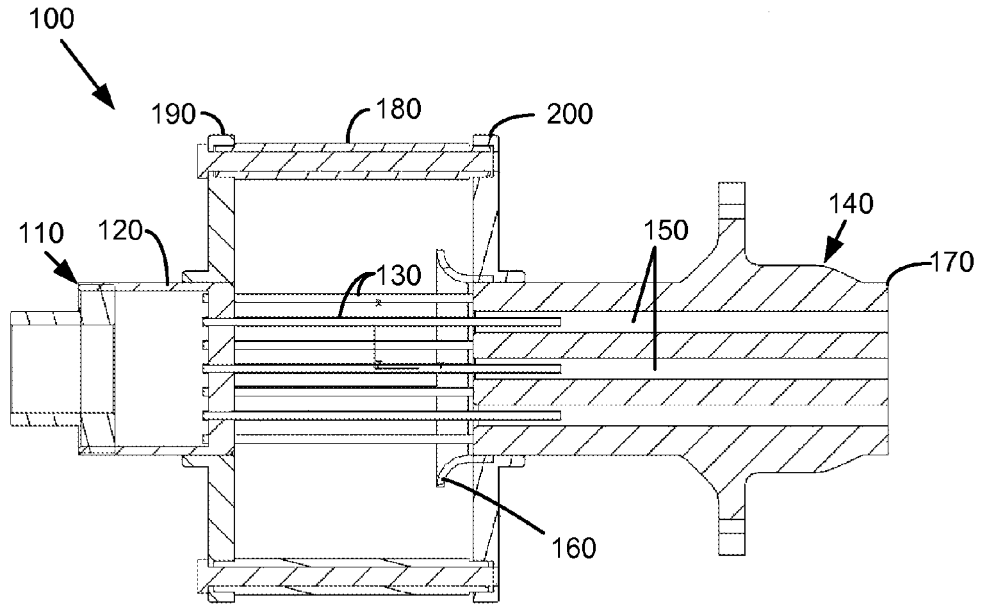
FIG. 3 is a side cross-sectional view of the premixer of FIG. 2.

FIG. 2 shows a premixer 100 as may be described herein. The premixer 100 may be used in the combustor 30 described above and in similar devices. The premixer 100 may include a fuel plenum 110. The fuel plenum 110 may include a chamber 120 in communication with a number of fuel tubes 130. The chamber 120 may have any desired size or configuration. Any number of fuel tubes 130 may be used herein. The fuel tubes 130 may have any desired size or configuration.

The premixer 100 also may include a burner tube 140. The burner tube 140 may include a number of air tubes 150 extending therethrough. Any number of the air tubes 150 may be used. The air tubes 150 may have any desired size or configuration. The air tubes 150 may extend from a bell mouth 160 facing the fuel plenum 110 to an opposite burner tube nozzle 170. The air tubes 150 may have a larger diameter as compared to the fuel tubes 130.

The fuel plenum 110 and the burner tube 140 may be separated by a number of spacers 180. Any number of spacers 180 may be used. The spacers 180 may have any desired size or configuration. The spacers 180 may be attached to a fuel plenum flange 190 on one end and a burner tube flange 200 on the other. The flanges 190, 200 may have any desired size or configuration. Other types of connection means may be used herein. The spacing between the fuel plenum 110 and the burner tube 140 may vary.

A number of the fuel tubes 130 may extend from the fuel plenum 110 into a number of the air tubes 150 within the burner tube 140. Fuel thus may enter the fuel plenum 110 via the chamber 120, may be distributed to the fuel tubes 130, and then may be injected into the air stream in each air tube 150 so as to mix therein. Likewise, the air flow may be guided between the fuel plenum 110 and the bell mouth 160 and into the air tubes 150. Some or all of the air tubes 150 may have a fuel tube 130 positioned therein. The premixer 100 thus may use multiple air tubes 150 with multiple fuel tubes 130 so as to create multiple co-flow jets of air and fuel. The closer each fuel tube 130 may end to the bell mouth 160 about each air tube 150, the better the fuel and the air may mix within the air tube 150. The size and number of the tubes 130, 150 may vary.Other configurations of the premixer 100 may be used herein.

Figure 4:
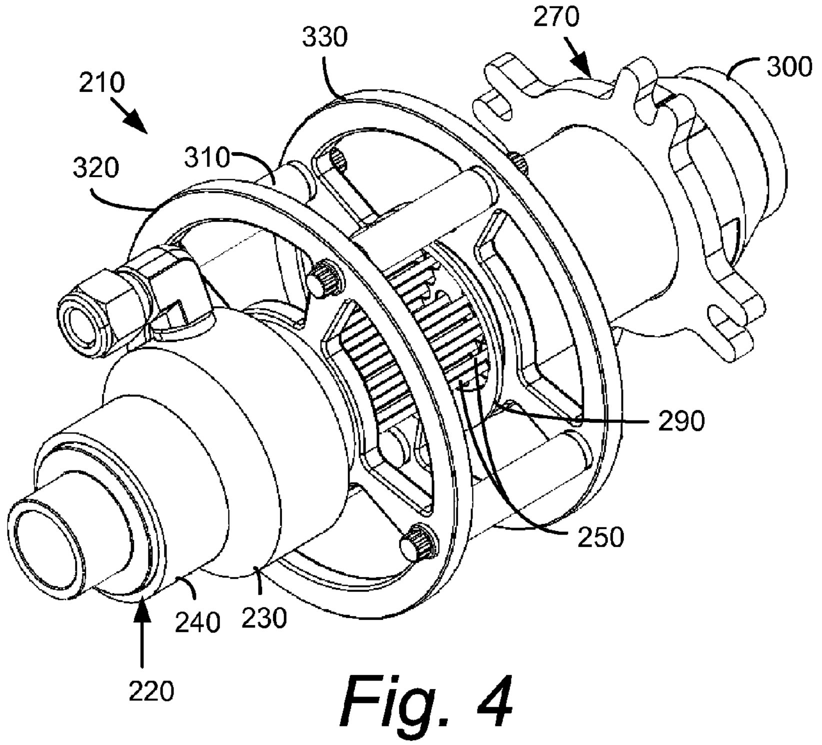
FIG. 4 is a perspective view of an alternative embodiment of a premixer as is described herein.
Figure 5:
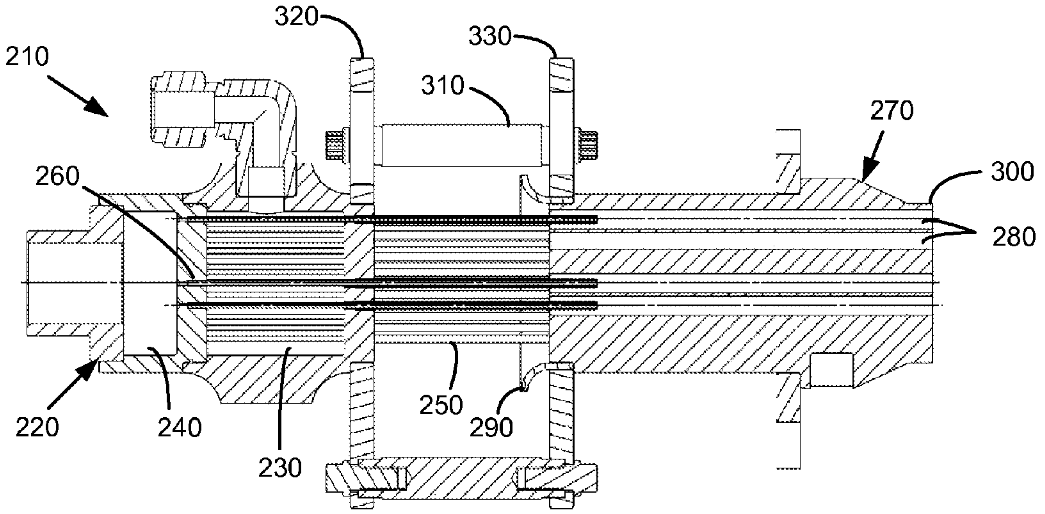
FIG. 5 is a side cross-sectional view of the premixer of FIG. 4.

FIGS. 4 and 5 show an alternative embodiment of a premixer 210 as is described herein. In this embodiment, the premixer 210 includes a fuel plenum 220 with an inner chamber 230 and an outer chamber 240. The chambers 230, 240 may have any desired size or configuration. (The positioning of the inner chamber 230 and the outer chamber 240 is for identification only. The positioning is relative.) A number of inner chamber fuel tubes 250 may extend from the inner chamber 230. Likewise, a number of outer chamber fuel tubes 260 may extend from the outer chamber 240 and pass through the inner chamber 230. The size and number of the tubes 250, 260 may vary. The outer chamber fuel tubes 260 may surround the inner chamber fuels tubes 250. Other configurations may be used herein.

The premixer 210 also includes a burner tube 270. As above, the burn tube 270 includes a number of air tubes 280 extending therethrough. The size and number of the air tubes 280 may vary. The air tubes 280 may extend from a bell mouth 290 to a burner nozzle 300. Some of the air tubes 280 may have inner chamber fuel tubes 250 extending therein while others may have outer chamber fuel tubes 260 extending therein. The air tubes 280 may have a larger diameter as compared to the fuel tubes 250, 260.

The premixer 210 also may include a number of spacers 310 that separate the fuel plenum 220 and the burner tube 270. Any number of spacers 310 may be used. The spacers 210 may have any desired size or configuration. The fuel plenum 220 may have a fuel plenum flange 320 while the burner tube 270 may have a burner tube flange 330. The flanges 320, 330 may have any desired size or configuration. Other types of connection means may be used herein. The spacing between the fuel plenum 220 and the burner tube 270 may vary.

Fuel or other types of flows thus may flow from the inner and the outer chambers 230, 240, through the fuel tubes 250, 260, and mix with the air in the air tubes 280. The inner and outer chambers 230, 240 may be used with different arrangements of fuel, air, and diluents. For example, the outer chamber 240 may be used with a diluent such as nitrogen ($N_2$) while the inner chamber 230 may be used with a fuel such as hydrogen ($H_2$). Alternatively, the diluent flow may be or include a less reactive fuel. This arrangement of diluent and fuel may create a diluent inert sheath surrounding the flow of fuel. Such an outer inert sheath passing through the air tubes 280 may prevent flame holding about the burner nozzle 300.

Other fuel and air mixing mechanisms may be used herein. For example, the inner chamber 230 may be arranged with air while the outer chamber 240 may have a mixture of hydrogen and nitrogen. Likewise, the inner chamber 230 may use nitrogen while the outer chamber 240 may use combinations of hydrogen and nitrogen. Other arrangements and different types and combinations or air, fuel, and diluent may be used herein.

The premixers 100, 210 described herein thus may use multiple fuel and air tubes to create multiple co-flow jets of air and fuel. Fuel and air mixing may be enhanced due to the length versus the diameter of the air tubes. The premixers 100, 210 also may use jets of fuel in combination with a sheath of diluent and/or diluent and air. The multiple jets also provide an increased flame holding margin due to the increased axial component of the fuel flow to air flow and by compartmentalizing the conventional burner tube into the multiple tubes. Local quenching also may be induced by the inert nitrogen, other diluents, and/or a high flow of air so as to limit flame holding. Very low emissions thus may be achieved by the good mixing caused by injecting the fuel into each small air tube.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A premixer for a combustor, comprising:

a fuel plenum comprising a plurality of fuel tubes extending therefrom;

a burner tube comprising a plurality of elongate air tubes;

a bell mouth disposed at least partially about the plurality of fuel tubes and extending from an aft end of the burner tube towards an aft end of the premixer so as to direct air into the plurality of elongate air tubes;

the plurality of fuel tubes extend at least partially into the plurality of elongate air tubes;

a fuel plenum flange extending radially about the fuel plenum;

a burner tube flange extending radially about the burner tube and axially downstream of the bell mouth with respect to the direction of fuel flow; and one or more spacers connecting the fuel plenum flange and the burner tube flange.

2. The premixer of claim 1, the burner tube comprises a burner tube nozzle at a second end.

3. The premixer of claim 2, the plurality of elongate air tubes extends from the bell mouth to the burner tube nozzle.

4. The premixer of claim 1, the fuel plenum comprises a chamber in communication with the plurality of fuel tubes.

5. The premixer of claim 1, the plurality of elongate air tubes comprises a first diameter, the plurality of fuel tubes comprises a second diameter, and the first diameter is larger than the second diameter.

6. A premixer for a combustor, comprising:

a fuel plenum comprising a plurality of first flow tubes and a plurality of second flow tubes extending therefrom;

a burner tube comprising a plurality of elongate air tubes;

a bell mouth disposed at least partially about the plurality of fuel tubes and extending from an all end of the burner tube towards an aft end of the premixer so as to direct air into the plurality of elongate air tubes;

the plurality of first flow tubes and the plurality of second flow tubes extend at least partially into the plurality of elongate air tubes;

a fuel plenum flange extending radially about the fuel plenum;

a burner tube flange extending radially about the burner tube and axially downstream of the bell mouth with respect to the direction of fuel flow; and one or more spacers connecting the fuel plenum flange and the burner tube flange.

7. The premixer of claim 6, the plurality of first flow tubes surrounds the plurality of second flow tubes.

8. The premixer of claim 6, the burner tube comprises a burner tube nozzle at a second end.

9. The premixer of claim 8, the plurality of elongate air tubes extends from the bell mouth to the burner tube nozzle.

10. The premixer of claim 6, the plurality of elongate air tubes comprises a first diameter, the plurality of first flow tubes and the plurality of second flow tubes comprise a second diameter, and the first diameter is larger than the second diameter.

* * * * *